US 9,279,680 B2

(12) United States Patent
Buchanan et al.

(10) Patent No.: US 9,279,680 B2
(45) Date of Patent: Mar. 8, 2016

(54) METHODS AND DEVICES FOR DETERMINING ORIENTATION

(75) Inventors: Nathan Daniel Pozniak Buchanan, Waterloo (CA); Nazih Almalki, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 658 days.

(21) Appl. No.: 13/420,753

(22) Filed: Mar. 15, 2012

(65) Prior Publication Data

US 2013/0245982 A1    Sep. 19, 2013

(51) Int. Cl.
*G01C 25/00* (2006.01)
*G01C 21/00* (2006.01)
*G01C 19/00* (2013.01)

(52) U.S. Cl.
CPC ............ *G01C 19/00* (2013.01); *G01C 21/00* (2013.01); *G01C 25/005* (2013.01)

(58) Field of Classification Search
CPC ...... G01C 19/02; G01C 19/728; G01C 21/00; G01C 19/00; G01C 25/00
USPC .............. 702/93, 104, 150, 153, 16; 701/400, 701/408
See application file for complete search history.

(56) References Cited

U.S. PATENT DOCUMENTS

| | | | | |
|---|---|---|---|---|
| 6,332,103 | B1 * | 12/2001 | Steenson et al. | 701/1 |
| 7,219,003 | B2 * | 5/2007 | Hagel et al. | 701/104 |
| 7,219,033 | B2 * | 5/2007 | Kolen | 702/150 |
| 2005/0270540 | A1 * | 12/2005 | Bowser | 356/460 |
| 2006/0184336 | A1 | 8/2006 | Kolen | |
| 2011/0053698 | A1 * | 3/2011 | Stites et al. | 473/223 |
| 2011/0071785 | A1 * | 3/2011 | Heath | 702/96 |
| 2013/0158928 | A1 * | 6/2013 | Hogdal | 702/104 |

FOREIGN PATENT DOCUMENTS

| | | | |
|---|---|---|---|
| WO | 2009077976 A2 | 6/2009 | |
| WO | WO2009/077976 | * 6/2009 | |
| WO | WO-2009077976 | * 6/2009 | ............. G01C 17/28 |

OTHER PUBLICATIONS

EPO, Extended European Search Report, relating to application No. 12159717.3 dated Aug. 14, 2012.
CIPO, CA Office Action relating to Application No. 2,805,951, dated Jul. 17, 2014.

* cited by examiner

*Primary Examiner* — Mohamed Charioui
*Assistant Examiner* — Catherine Rastovski
(74) *Attorney, Agent, or Firm* — Rowand LLP (57) ABSTRACT

Methods and electronic devices for determining orientation are described. In one aspect, a processor-implemented method of determining a corrected orientation of a gyroscope on an electronic device includes: generating a gyroscope reading using the gyroscope; determining, by the processor, a first orientation estimate based on the gyroscope reading and a past corrected orientation; determining, by the processor, whether the gyroscope was saturated when the gyroscope reading was generated; adjusting, by the processor, a saturation correction learning rate for the gyroscope based on the result of the determination of whether the gyroscope was saturated; and calculating, by the processor, the corrected orientation based on the first orientation estimate, a second orientation estimate and the saturation correction learning rate.

17 Claims, 4 Drawing Sheets

METHODS AND DEVICES FOR DETERMINING ORIENTATION

TECHNICAL FIELD

The present disclosure relates generally to electronic device orientation and, more particularly, to methods and devices for determining an orientation of an electronic device.

BACKGROUND

A gyroscope is a device which may be used for measuring rotation rate. Gyroscopes are sometimes included in electronic devices, such as handheld electronic devices, in order to provide information about the orientation of such electronic devices. Such orientation information allows the electronic device to know information about its own physical position. For example, the gyroscope may allow for recognition of movement within a three dimensional space. The electronic device may use such orientation information as an input signal. That is, the electronic device may be operated in a mode in which gyroscope measurements affect the operation of the electronic device.

Gyroscope readings may be useful for determining an estimate of the orientation of an electronic device. Orientation estimates which are determined based on gyroscope readings are particularly accurate when the electronic device is rotating slowly. However, when an electronic device begins to rotate quickly, orientation estimates which are determined based on gyroscope readings may become more inaccurate since the gyroscope may be unable to determine an accurate measure of the speed of rotation if the electronic device rotates too quickly. That is, the electronic device may be rotated at a speed which is beyond the gyroscope's measurement capabilities. At such a point, the gyroscope may become saturated and may output gyroscope readings which do not accurately reflect the rotation of the electronic device.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure provides a processor-implemented method of determining a corrected orientation of a gyroscope on an electronic device. The method includes: obtaining a gyroscope reading; determining a first orientation estimate based on the gyroscope reading and a past corrected orientation; determining whether the gyroscope was saturated when the gyroscope reading was obtained; adjusting a saturation correction learning rate for the gyroscope based on the result of the determination of whether the gyroscope was saturated; and determining a corrected orientation based on the first orientation estimate, a second orientation estimate and the saturation correction learning rate.

In another aspect, the present disclosure describes an electronic device. The electronic device includes a memory and a gyroscope. The electronic device also includes a processor coupled to the memory and the gyroscope. The processor is configured to determine a corrected orientation of the gyroscope by: obtaining a gyroscope reading; determining a first orientation estimate based on the gyroscope reading and a past corrected orientation; determining whether the gyroscope was saturated when the gyroscope reading was obtained; adjusting a saturation correction learning rate for the gyroscope based on the result of the determination of whether the gyroscope was saturated; and determining a corrected orientation based on the first orientation estimate, a second orientation estimate and the saturation correction learning rate.

In another aspect, the present disclosure describes a computer readable storage medium including computer-executable instructions for determining a corrected orientation for a gyroscope by: obtaining a gyroscope reading; determining a first orientation estimate based on the gyroscope reading and a past corrected orientation; determining whether the gyroscope was saturated when the gyroscope reading was obtained; adjusting a saturation correction learning rate for the gyroscope based on the result of the determination of whether the gyroscope was saturated; and determining a corrected orientation based on the first orientation estimate, a second orientation estimate and the saturation correction learning rate.

Other aspects of the present disclosure will be described below.

Example Electronic Device

Electronic devices may sometimes benefit from knowledge about their own orientation. For example, electronic devices are sometimes configured to operate based on the orientation of the electronic device. That is, the orientation of the electronic device may act as an input to an application, system or process whose actions depend on the orientation of the electronic device. For example, a display screen on a display of the electronic device may depend on the orientation of the electronic device. By way of example, the display screen may toggle between landscape and portrait orientations based on the orientation of the electronic device.

Thus, in at least some embodiments, the electronic device may benefit from knowledge about the orientation of the electronic device.

Figure 1:
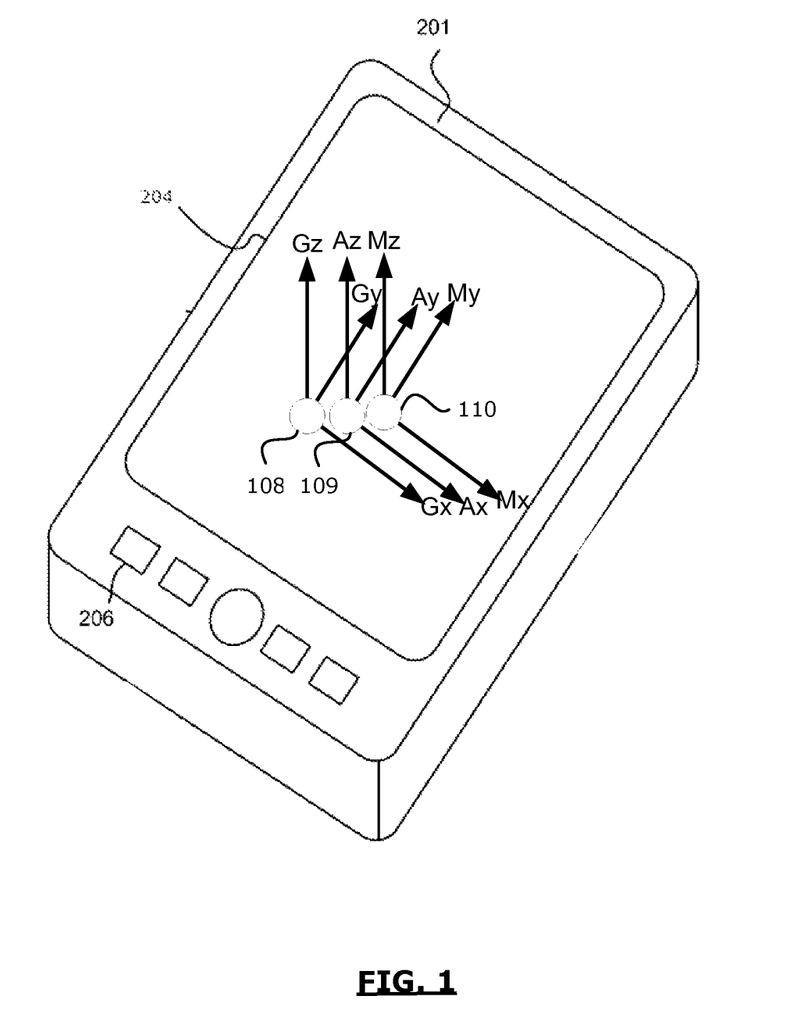
FIG. 1 is a perspective view of an electronic device in accordance with example embodiments of the present disclosure.

Referring first to FIG. 1, an example electronic device 201 is illustrated. In the embodiment illustrated, the electronic device 201 is a handheld mobile communication device. However, the electronic device 201 may take a variety of forms. By way of example, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. In some embodiments, the display 204 may be a touchscreen display which permits a user to provide input to the electronic device 201 by touching the display 204. That is, the display 204 may act as an input interface 206 to the electronic device 201, providing the electronic device 201 with an electronic signal generated in response to user contact with the touchscreen display.

The electronic device 201 includes one or more sensors, which may be used by the electronic device 201 to determine the orientation of the electronic device 201. In the example embodiment illustrated, the electronic device 201 includes a gyroscope 108. The gyroscope 108 measures rotational velocity of the gyroscope 108. In the embodiment illustrated, since the gyroscope 108 is integrated within the electronic device 201, the gyroscope 108 effectively measures rotational velocity of the electronic device 201. In the illustrated embodiment, the gyroscope 108 is illustrated using a circle, which is shown using a broken line to reflect the fact that the gyroscope 108 may be internally mounted within the electronic device 201. While the circular gyroscope 108 is useful for the purposes of illustration, the gyroscope 108 will typically take other forms. For example, the gyroscope 108 may have a standard electronic chip form factor.

The gyroscope 108 includes one or more sensing axis. In the embodiment illustrated, the gyroscope 108 includes three orthogonal sensing axes denoted Gx (to represent the gyroscope's x sensing axis), Gy (to represent the gyroscope's y sensing axis) and Gz (to represent the gyroscope's z sensing axis) Each sensing axis is orthogonal to the other sensing axes. For example, the x sensing axis (Gx) is orthogonal to the y and z sensing axes (Gy and Gz respectively), the y sensing axis (Gy) is orthogonal to the x and z sensing axes (Gx and Gz respectively) and the z sensing axis (Gz) is orthogonal to the x and y sensing axes (Gx and Gy respectively).

The gyroscope 108 may produce a gyroscope reading for each of the sensing axes, Gx, Gy, Gz. For example, a gyroscope reading $w_x$ may be produced by the gyroscope based on gyroscope measurements associated with the x sensing axis (such as a rotation about the x sensing axis), a gyroscope reading $w_y$ may be produced by the gyroscope based on gyroscope measurements associated with the y sensing axis (such as a rotation about the y sensing axis), and a gyroscope reading $w_z$ may be produced by the gyroscope based on gyroscope measurements associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes Gx, Gy, Gz of the gyroscope 108. The electronic signal may, for example, provide the gyroscope readings $w_x$, $w_y$, $w_z$ for the sensing axes Gx, Gy, Gz of the gyroscope 108 as measures of an amount of rotation per unit time about each sensing axis. For example, the gyroscope 108 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample. Such samples may be obtained, for example, at regular intervals.

The gyroscope output may separate the gyroscope readings for each sensing axis at a signal level or at an output interface level, or both. For example, in some embodiments, the gyroscope 108 may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin).

In some embodiments, the gyroscope 108 may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The sensing axes Gx, Gy, Gz of the gyroscope 108 may be aligned with the form factor of the electronic device 201. For example, in the embodiment illustrated the axes are aligned such that, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

The gyroscope 108 may be limited in its ability to accurately estimate a rate of rotation. More particularly, the gyroscope 108 may have an operating range. When the gyroscope 108 is operated within its operating range, it may produce an output which accurately reflects the rate at which it is being rotated. However, when the gyroscope 108 is operated outside of its operating range (e.g. when it is rotated at a speed which is faster than it is equipped to handle), then it may produce an output which does not accurately reflect the rotation rate of the gyroscope 108. When the gyroscope 108 is operated outside of its operating range, the gyroscope 108 is referred to as being saturated.

In some embodiments, when the gyroscope 108 is saturated, the gyroscope 108 may generate an output which may be referred to as a saturated output. The saturated output may be a common output which is produced irrespective of the degree to which the gyroscope 108 is saturated. That is, whenever the gyroscope 108 is saturated, it may produce the same output. If the gyroscope 108 is rotating at a rate which is slightly above its operating range, it will produce the same saturated output which is produced when the gyroscope 108 is rotating at a rate which is well above its operating range. In some embodiments, the saturated output may be the highest output that the gyroscope 108 generates. That is, the saturated output may be the highest gyroscope reading generated by the gyroscope 108. In such embodiments, the electronic device 201 may determine whether the gyroscope 108 is saturated by monitoring gyroscope readings and by determining whether a current reading reflects the highest gyroscope reading for the gyroscope 108. That is, if the electronic device 201 determines that the gyroscope reading is the highest reading observed for the gyroscope 108, then the electronic device 201 may determine that the gyroscope 108 is saturated. The evaluation as to whether the gyroscope reading represents the highest reading observed may, in at least some embodiments, be performed on a per-axis basis. That is, the electronic device 201 may store the highest reading observed for each axis and may determine whether the gyroscope 108 is saturated by comparing the current gyroscope reading for each axis to the highest reading observed for that axis.

The electronic device 201 may also include an accelerometer 109. An accelerometer 109 is a device which generates an output signal in dependence on the acceleration of the accelerometer 109. That is, the accelerometer 109 produces an output which reflects the acceleration of the accelerometer. More particularly, the accelerometer 109 may generate an output which specifies the magnitude and/or direction of acceleration. In the embodiment illustrated, since the accelerometer 109 is integrated within the electronic device 201, the accelerometer 109 effectively measures the acceleration of the electronic device 201.

In the illustrated embodiment, the accelerometer 109 is illustrated using a circle, which is shown using a broken line to reflect the fact that the accelerometer 109 may be internally mounted within the electronic device 201. While the circular accelerometer 109 is useful for the purposes of illustration, the accelerometer 109 will typically take other forms. For example, the accelerometer 109 may have a standard electronic chip form factor.

In some embodiments, the accelerometer 109 may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The accelerometer 109 includes one or more sensing axis. In the embodiment illustrated, the accelerometer 109 includes three orthogonal sensing axes denoted Ax (to represent the accelerometer's x sensing axis), Ay (to represent the accelerometer's y sensing axis) and Az (to represent the accelerometer's z sensing axis) Each sensing axis is orthogonal to the other sensing axes. For example, the x sensing axis (Ax) is orthogonal to the y and z sensing axes (Ay and Az respectively), the y sensing axis (Ay) is orthogonal to the x and z sensing axes (Ax and Az respectively) and the z sensing axis (Az) is orthogonal to the x and y sensing axes (Ax and Ay respectively).

The accelerometer 109 may produce an accelerometer reading for each of the sensing axes, Ax, Ay, Az. For example, an accelerometer reading $a_x$ may be produced by the accelerometer 109 based on accelerometer measurements associated with the x sensing axis (such as an acceleration along the x sensing axis), an accelerometer reading $a_y$ may be produced by the accelerometer 109 based on accelerometer measurements associated with the y sensing axis (such as an acceleration along the y sensing axis), and an accelerometer reading $a_z$ may be produced by the accelerometer 109 based on accelerometer measurements associated with the z sensing axis (such as an acceleration along the z sensing axis). These accelerometer readings collectively form the accelerometer output. That is, the accelerometer output is an electronic signal which is representative of the accelerometer readings $a_x$, $a_y$, $a_z$ for the sensing axes Ax, Ay, Az of the accelerometer 109.

As shown in FIG. 1, the sensing axes Ax, Ay, Az of the accelerometer 109 may be aligned with the form factor of the electronic device 201. In the embodiment illustrated, the x and y sensing axes (Ax and Ay) are generally parallel to the front face of the electronic device and the z sensing axis (Az) is generally perpendicular to the front face of the electronic device. One or more of the sensing axes Ax, Ay, Az of the accelerometer 109 may be aligned with one or more of the sensing axes Gx, Gy, Gz of the gyroscope 108.

The electronic device 201 may also include a magnetometer 110. The magnetometer 110 (which may also be referred to as a digital compass) is a measuring instrument which is used to measure the strength and/or direction of magnetic fields. That is, the magnetometer 110 generates an electronic signal which reflects the direction and/or strength of a magnetic field in the vicinity of the magnetometer 110. Since the magnetometer 110 is mounted within the electronic device 201, the magnetometer 110 effectively reflects the direction and/or strength of a magnetic field acting on the electronic device 201.

In the illustrated embodiment, the magnetometer 110 is illustrated using a circle, which is shown using a broken line to reflect the fact that the magnetometer 110 may be internally mounted within the electronic device 201. While the circular magnetometer 110 is useful for the purposes of illustration, the magnetometer 110 will typically take other forms. For example, the magnetometer 110 may have a standard electronic chip form factor.

In some embodiments, the magnetometer 110 may be a digital magnetometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The magnetometer 110 is, in at least some embodiments, a three axis magnetometer 110 which includes three sensing axes Mx, My, Mz. In the embodiment illustrated, the magnetometer 110 includes three orthogonal sensing axes denoted Mx (to represent the magnetometer's x sensing axis), My (to represent the magnetometer's y sensing axis) and Mz (to represent the magnetometer's z sensing axis) Each sensing axis is orthogonal to the other sensing axes. For example, the x sensing axis (Mx) is orthogonal to the y and z sensing axes (My and Mz respectively), the y sensing axis (My) is orthogonal to the x and z sensing axes (Mx and Mz respectively) and the z sensing axis (Mz) is orthogonal to the x and y sensing axes (Mx and My respectively).

The magnetometer 110 may produce a magnetometer reading for each of the sensing axes, Mx, My, Mz. For example, a magnetometer reading $m_x$ may be produced by the magnetometer 110 based on magnetometer measurements associated with the x sensing axis (such as a magnetic field along the x sensing axis), a magnetometer reading $m_y$ may be produced by the magnetometer 110 based on magnetometer measurements associated with the y sensing axis (such as a magnetic field along the y sensing axis), and a magnetometer reading $m_z$ may be produced by the magnetometer 110 based on magnetometer measurements associated with the z sensing axis (such as a magnetic field along the z sensing axis). These magnetometer readings collectively form the magnetometer output. That is, the magnetometer output is an electronic signal which is representative of the magnetometer readings $m_x$, $m_y$, $m_z$ for the sensing axes Mx, My, Mz of the magnetometer 110.

As shown in FIG. 1, the sensing axes Mx, My, Mz of the magnetometer 110 may be aligned with the form factor of the electronic device 201. In the embodiment illustrated, the x and y sensing axes (Mx and My) are generally parallel to the front face of the electronic device 201 and the z sensing axis (Mz) is generally perpendicular to the front face of the electronic device 201. One or more of the sensing axes Mx, My, Mz of the magnetometer 110 may be aligned with one or more of the sensing axes Gx, Gy, Gz of the gyroscope 108 and/or one or more sensing axes Ax, Ay, Az of the accelerometer 109.

While FIG. 1 illustrates three separate sensors (e.g. a gyroscope 108, an accelerometer 109, and a magnetometer 110), in some embodiments, two or more of these sensors may be provided in a common packaging, such as a common electronic chip. For example, in some embodiments, a single electronic chip may include both an accelerometer 109 and a magnetometer 110.

Figure 2:
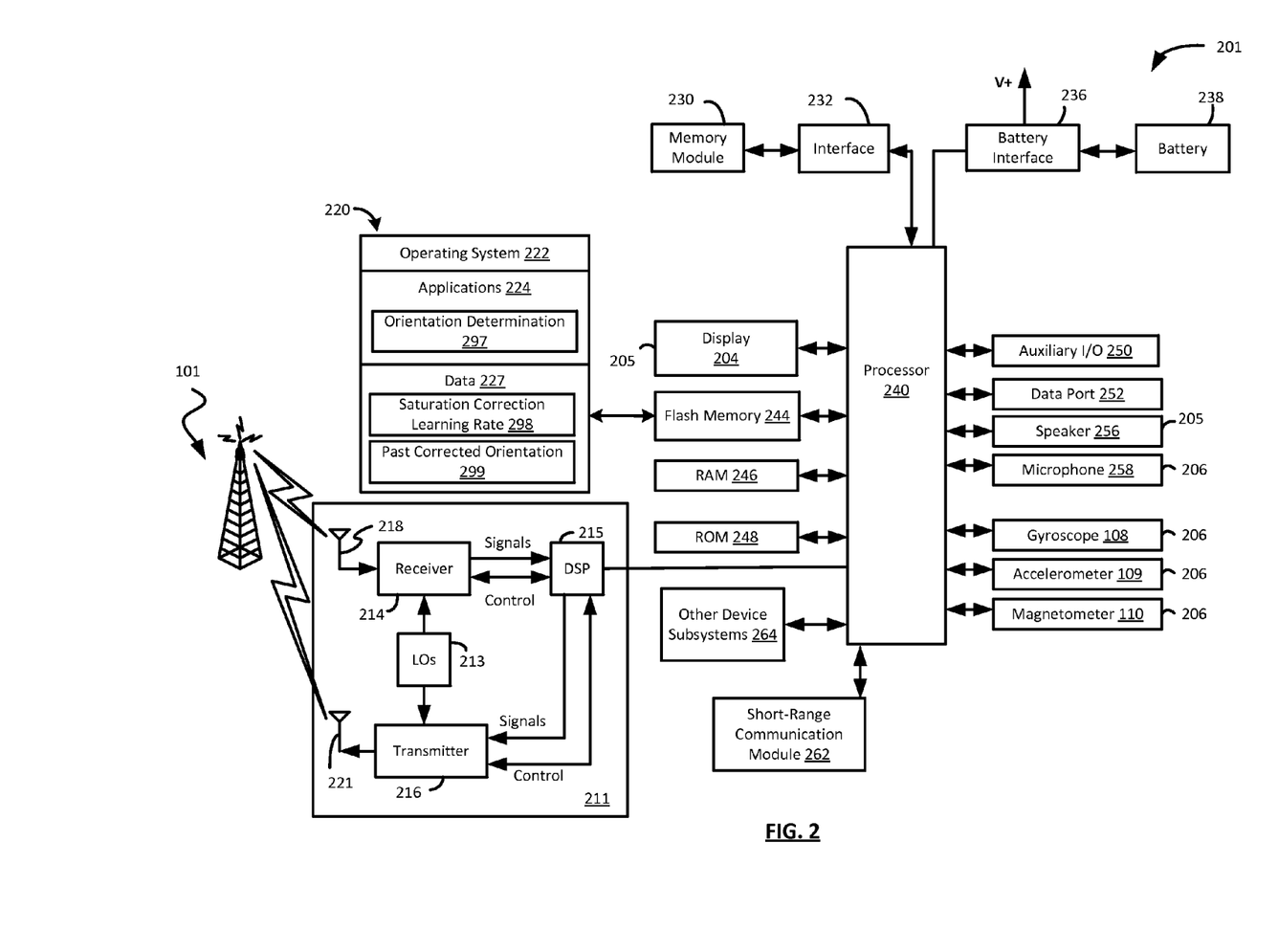
FIG. 2 is a block diagram of example components of an electronic device in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a gyroscope 108, an accelerometer 109, a magnetometer 110 and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 may, in at least some embodiments, include a saturation correction learning rate 298. As will be described in greater detail in the discussion of the orientation determination application 297 and the method 300 of FIG. 3, the saturation correction learning rate 298 may be used to control the amount of correction which will be applied to an orientation estimate obtained based on a gyroscope reading. As will be further discussed below, the saturation correction learning rate 298 may be determined to depend, at least in part, on whether the gyroscope 108 is saturated (and/or whether it was saturated in the past). That is, the saturation correction learning rate (which will be used to correct an orientation estimate obtained based on a gyroscope reading) may be increased if the gyroscope 108 is saturated. If the gyroscope 108 remains saturated for an extended period of time, the saturation correction learning rate 298 may be iteratively increased over time. That is, during a period of uninterrupted saturation, the saturation correction learning rate 298 which will be used to correct an orientation estimate determined from a gyroscope reading obtained early in the period of saturation, will be less than the saturation correction learning rate 298 which will be used to correct an orientation estimate determined from a gyroscope reading obtained later in the period of saturation. That is, during a period of uninterrupted saturation of the gyroscope 108, the saturation correction learning rate will be iteratively increased so that the degree of correction becomes greater over time.

The data 227 may also include a past corrected orientation 299. The past corrected orientation 299 may be an orientation estimate for the electronic device 201 which was previously determined. The past corrected orientation 299 may be an orientation which was previously determined and which was previously corrected for gyroscope saturation and/or other sources of errors. The past corrected orientation 299 may be used, for example, to allow the electronic device 201 to determine an orientation of the electronic device 201 from the gyroscope readings obtained from the gyroscope 108. That is, the past corrected orientation 299 may serve as a reference point for determining orientation from gyroscope readings. Gyroscope readings may not, taken alone, provide the electronic device 201 with enough information to determine the electronic device's orientation. However, gyroscope readings, when coupled with a reference point (such as the past corrected orientation 299) may provide the electronic device 201 with information which allows the electronic device 201 to determine the orientation.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

Since the past corrected orientation 299 and/or the saturation correction learning rate 298 may be current (i.e. representative of a current orientation and/or representative of an accurate learning rate) for only a short period of time, in some embodiments, the past corrected orientation 299 and/or the saturation correction learning rate 298 are stored in a temporary storage. For example, the past corrected orientation 299 and/or the saturation correction learning rate 298 may be stored in an area of memory which is reserved for storing transient data.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or BLUETOOTH® (BLUETOOTH® is a registered trademark of Bluetooth SIG, Inc.) connection to the host computer system using standard connectivity protocols. When a user connects their electronic device 201 to the host computer system via a USB cable or BLUETOOTH® connection, traffic that was destined for the wireless network 101 is automatically routed to the electronic device 201 using the USB cable or BLUETOOTH® connection. Similarly, any traffic destined for the wireless network 101 is automatically sent over the USB cable BLUETOOTH® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 includes a gyroscope 108 which is configured to sense rotation of the electronic device 201. The gyroscope 108 may, in at least some embodiments, be a three-axis gyroscope of the type described above with reference to FIG. 1. The electronic device 201 also includes an accelerometer 109 and/or a magnetometer 110 which may be of the types described above with reference to FIG. 1.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, an orientation determination application 297.

In the example embodiment of FIG. 2, the orientation determination application 297 is illustrated as being implemented as a stand-alone application 224. However, in other example embodiments, the orientation determination 297 could be provided by another application or module such as, for example, the operating system software 222. Furthermore, while the orientation determination application 297 is illustrated with a single block, the functions or features provided by the orientation determination application 297 could, in at least some embodiments, be divided up and implemented by a plurality of applications and/or modules.

Furthermore, while, in the example embodiment of FIG. 2, the orientation determination application 297 is illustrated as being associated with the main processor 240 of the electronic device 201, in other embodiments, the orientation determination application 297 could be associated with another processor, or group of processors. For example, in some embodiments, the gyroscope 108, accelerometer 109 and/or magnetometer 110 may include or be connected to a secondary processor. The secondary processor may provide a narrow set of functions or features and may be used to offload some processing from the main processor 240. For example, in some embodiments, the secondary processor is a sensor-specific processor which is configured to provide sensor-related functions such as those provided by the orientation determination application 297. For example, the secondary processor may be configured to determine an orientation of the electronic device.

The orientation determination application 297 is, in at least some embodiments, configured to determine a corrected orientation for the electronic device 201. The corrected orientation is an orientation which accounts for gyroscope saturation. The orientation determination application 297 may be configured to determine the orientation in the manner described below with reference to FIGS. 3 and 4.

Accordingly, further functions and features of the orientation determination application 297 will be described in greater detail below with reference to FIGS. 3 to 4.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Obtaining Corrected Orientation

In the description which follows, reference will be made to FIG. 3 which illustrates, in flowchart form, a method 300 of determining a corrected orientation of a gyroscope 108 on an electronic device 201. The method 300 may include features which may be provided by an electronic device 201, such as the electronic device 201 of FIGS. 1 and 2. For example, one or more applications or modules associated with an electronic device 201, such as the orientation determination application 297 (FIG. 2), may contain processor readable instructions for causing a processor associated with the electronic device 201 to perform the method 300 of FIG. 3. That is, in at least some example embodiments, the electronic device 201 may be configured to perform the method 300. For example, the method 300 may be implemented by a processor 240 (FIG. 2) of an electronic device 201 (FIG. 2).

In at least some embodiments, one or more of the functions or features of one or the method 300 may be performed, in whole or in part, by another system, software application, module, component or device apart from those specifically listed above. For example, in some embodiments, the method 300 may be performed by a processor associated with the gyroscope 108, the accelerometer 109 and/or the magnetometer 110. That is, in at least some embodiments, the method 300 or a portion thereof may be performed by a processor other than the main processor the electronic device 201. For example, a separate processor may be configured for the specific purpose of performing the method 300 or a portion thereof.

At 302, a gyroscope reading is obtained from the gyroscope 108. In at least some embodiments, gyroscope readings for each axis of the gyroscope 108 may be obtained. For example, a gyroscope reading $w_x$ may be obtained from the gyroscope 108 based on gyroscope measurements associated with the x sensing axis (such as a rotation about the x sensing axis), a gyroscope reading $w_y$ may be obtained from the gyroscope 108 based on gyroscope measurements associated with the y sensing axis (such as a rotation about the y sensing axis), and a gyroscope reading $w_z$ may be obtained from the gyroscope 108 based on gyroscope measurements associated with the z sensing axis (such as a rotation about the z sensing axis).

Similarly, at 304, an accelerometer reading is obtained from the accelerometer 109. In at least some embodiments, accelerometer readings for each axis of the accelerometer 109 may be obtained at 304. For example, an accelerometer reading $a_x$ may obtained from the accelerometer 109 based on accelerometer measurements associated with the x sensing axis (such as an acceleration along the x sensing axis), an accelerometer reading $a_y$ may be obtained from the accelerometer 109 based on accelerometer measurements associated with the y sensing axis (such as an acceleration along the y sensing axis), and an accelerometer reading $a_z$ may be obtained from the accelerometer 109 based on accelerometer measurements associated with the z sensing axis (such as an acceleration along the z sensing axis).

Similarly, at 306, a magnetometer reading may be obtained from the magnetometer 110. In at least some embodiments, magnetometer readings for each axis of the magnetometer 110 may be obtained at 306. For example, a magnetometer reading $m_x$ may be obtained from the magnetometer 110 based on magnetometer measurements associated with the x sensing axis (such as a magnetic field along the x sensing axis), a magnetometer reading $m_y$ may be obtained from the magnetometer 110 based on magnetometer measurements associated with the y sensing axis (such as a magnetic field along the y sensing axis), and a magnetometer reading $m_z$ may be obtained from the magnetometer 110 based on magnetometer measurements associated with the z sensing axis (such as a magnetic field along the z sensing axis).

Figure 3:
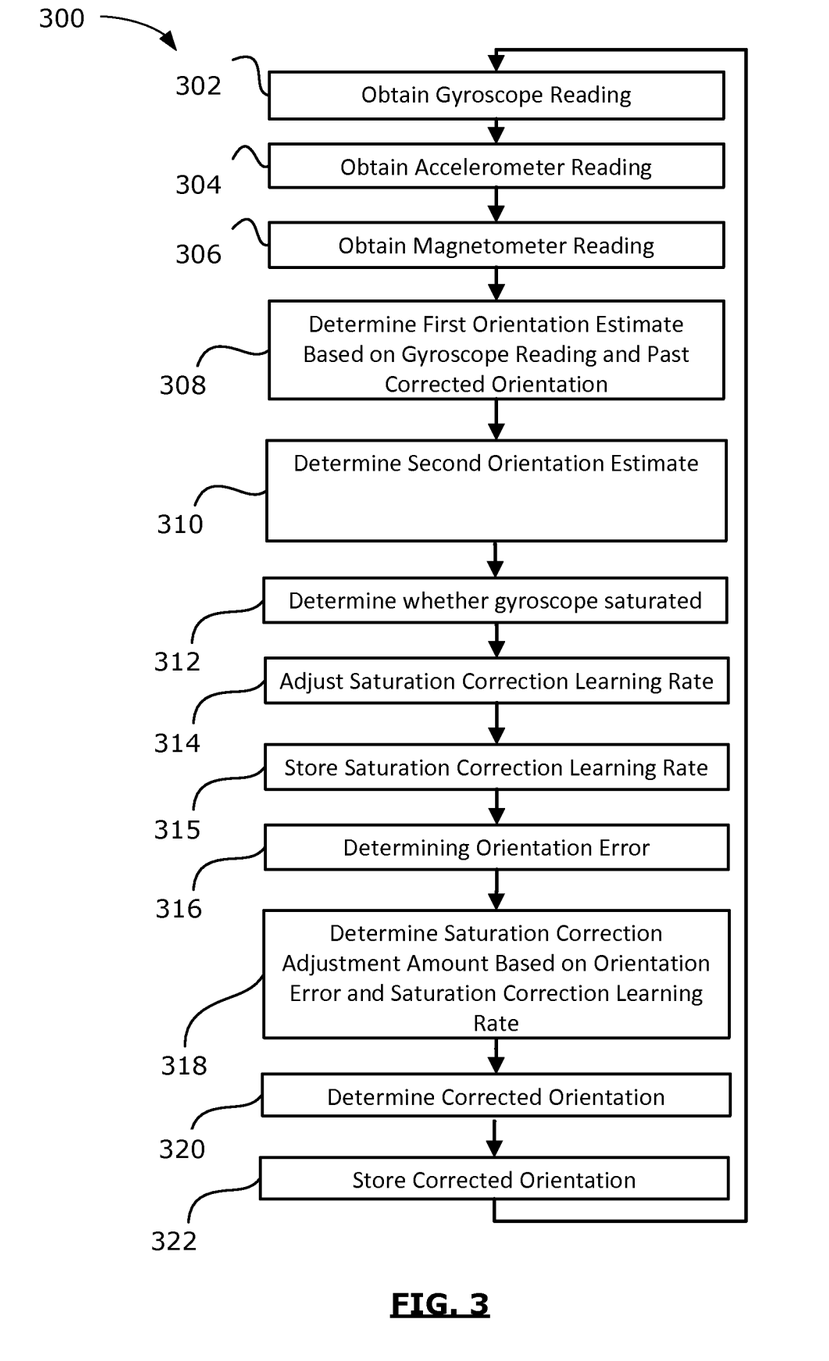
FIG. 3 is a flowchart of an example method for determining orientation in accordance with example embodiments of the present disclosure.

While operations 302, 304 and 306 have been illustrated in FIG. 3 to occur sequentially, in other embodiments, these operations may be performed in another order. For example, in some embodiments, any two or more of these operations 302, 304, 306 may be performed in parallel so that the electronic device 201 is in the same orientation or approximately the same orientation when the measurements are obtained. For example, in some embodiments, the gyroscope 109, magnetometer 110 and accelerometer 109 may be sampled at the same time.

At 308, a first orientation estimate is determined based on the gyroscope readings obtained at 302 and based on an orientation reference point, such as a past corrected orientation 299 (FIG. 2). The past corrected orientation 299 may be an orientation estimate for the electronic device 201 which was previously determined. The past corrected orientation 299 may have been previously corrected for gyroscope saturation and/or other sources of errors. The past corrected orientation 299 may, in at least some embodiments, be retrieved from memory at 308 and used to determine the first orientation estimate. As will be described in greater detail below with reference to operation 322, the past corrected orientation 299 may have been saved during a previous iteration of the method 300.

Accordingly, the past corrected orientation 299 may be used to allow the electronic device 201 to determine an orientation of the electronic device 201 from the gyroscope readings obtained from the gyroscope 108. That is, the past corrected orientation 299 may serve as a reference point for determining orientation from the gyroscope readings. Gyroscope readings may not, taken alone, provide the electronic device 201 with enough information to determine the electronic device's orientation. However, gyroscope readings, when coupled with a reference point (such as the past corrected orientation 299), may provide the electronic device 201 with information which allows the electronic device 201 to determine the first orientation estimate.

The first orientation estimate may, in some circumstances, suffer from an error due, at least in part, to the effects of gyroscope saturation. When the electronic device 201 is rotating relatively slowly, the first orientation estimate may be an accurate representation of the orientation of the electronic device 201. However, if the electronic device 201 is rotated more rapidly, the gyroscope 108 may become saturated. Saturation occurs when the electronic device 201 is rotated outside of the operating range of the gyroscope 108. That is, saturation occurs when the electronic device 201 is rotated at a rate at which the gyroscope 108 is unable to accurately measure the rate of rotation. Thus, in at least some circumstances, the first orientation estimate may suffer from an error due, at least in part, to the saturation of the gyroscope 108. As will now be described, the method 300 includes operations 310 to 320 which may be used to account for saturation of the gyroscope 108 to obtain a corrected orientation.

In at least some embodiments, at 310, the electronic device 201 may determine a second orientation estimate. The second orientation estimate is, in at least some embodiments, determined without using the gyroscope readings. That is, the second orientation estimate may be determined based on other information, such as information obtained from one or more other sensors. In the example embodiment of FIG. 3, the second orientation estimate is determined based on one or more accelerometer readings (obtained at 304) and also based on one or more magnetometer readings (obtained at 306). The second orientation estimate may provide a good measure of the orientation of the electronic device 201 when the electronic device 201 is rotating rapidly.

In at least some embodiments, at 312, the electronic device 201 may determine whether the gyroscope 108 was saturated when the gyroscope readings were obtained. That is, the electronic device 201 may determine whether the gyroscope readings obtained at 302 indicate that the gyroscope 108 was saturated. In at least some embodiments, at 312, the electronic device 201 may compare the gyroscope readings obtained to a gyroscope saturation value which reflects the saturation output for the gyroscope. The gyroscope saturation value is, in at least some embodiments, retrieved from memory.

In some embodiments, when the gyroscope 108 is saturated, the gyroscope 108 may generate an output which may be referred to as a saturated output. The saturated output may be a common output which is produced irrespective of the degree to which the gyroscope 108 is saturated. That is, whenever the gyroscope 108 is saturated, it may always produce an output which indicates that it is saturated (such as an output which corresponds to the stored gyroscope saturation value). If the gyroscope 108 is rotating at a rate which is slightly above its operating range, it may produce the same saturated output which is produced when the gyroscope 108 is rotating at a rate which is well above its operating range. In at least some embodiments, the saturated output may be stored in memory as the gyroscope saturation value.

In at least some embodiments, at 312, the electronic device 201 determines whether the gyroscope reading equals and/or exceeds the gyroscope saturation value. If so, then the electronic device 201 may determine that the gyroscope is saturated.

The gyroscope saturation value may, in some embodiments, be static. In some embodiments, the gyroscope saturation value may be stored based on specific operating characteristics of the gyroscope 108.

In other embodiments, the electronic device 201 may be configured to dynamically determine the gyroscope saturation value. In some embodiments, the saturated output may be the highest output that the gyroscope 108 generates. That is, the saturated output may be the highest gyroscope reading generated by the gyroscope 108. The highest gyroscope reading may be stored as the gyroscope saturation value. That is, the electronic device 201 may determine whether a current gyroscope reading exceeds a stored gyroscope saturation value and, if the gyroscope reading exceeds the gyroscope saturation value, the electronic device may replace the gyroscope saturation value with the gyroscope reading so that the gyroscope reading becomes the new gyroscope saturation value. Over time, the gyroscope saturation value will converge on the correct saturated output.

The evaluation as to whether the gyroscope reading represents the saturation output may, in at least some embodiments, be performed on a per-axis basis. For example, the electronic device 201 may store the highest reading observed for each axis and may determine whether the gyroscope is saturated by comparing the current gyroscope reading for each axis to the highest reading observed for that axis.

At 314, the electronic device 201 adjusts a saturation correction learning rate for the gyroscope 108 based on the result of the determination of whether the gyroscope was saturated. The saturation correction learning rate controls a rate of correction which will be used to correct the first orientation estimate. That is, the saturation correction learning rate is a parameter which controls how quickly the electronic device 201 will correct the first orientation estimate. In at least some embodiments, a relatively higher saturation correction learning rate results in a greater amount of correction than a relatively lower saturation correction learning rate.

In at least some embodiments, the saturation correction learning rate balances the relative importance of the first orientation estimate and the second orientation estimate when determining a corrected orientation. In at least some embodiments, a relatively higher saturation correction learning rate indicates greater importance of the second orientation estimate and lesser importance of the first orientation estimate than would be indicated by a relatively lower saturation correction learning rate. That is, a higher saturation correction learning rate indicates that the orientation estimate determined based on the gyroscope readings should be given less weight when determining the corrected orientation than the weight given when there is a lower saturation correction learning rate.

Similarly, in at least some embodiments, a relatively lower saturation correction learning rate indicates greater importance of the first orientation estimate and lesser importance of the second orientation estimate than would be indicated by a relatively higher saturation correction learning rate. That is, a lower saturation correction learning rate indicates that the orientation estimate determined based on the gyroscope readings should be given greater weight when determining the corrected orientation than the weight given when there is a higher saturation correction learning rate.

The saturation correction learning rate may, in at least some embodiments, be adjusted using a previously determined saturation correction learning rate 298 as a starting point. For example, the electronic device 201 may retrieve, from memory, a saturation correction learning rate 298 (FIG. 2) which was determined during a previous iteration of the method 300. The electronic device 201 may then adjust this saturation correction learning rate 298. The nature of the adjustment depends on the result of the determination (at 314) regarding whether the gyroscope 108 is saturated. Operation 314 will be described in greater detail below with reference to FIG. 4.

The saturation correction learning rate 298 (FIG. 2) may, at 315, be stored in memory of the electronic device 201. The stored saturation correction learning rate may be used in a subsequent iteration of the method 300 at 312 when adjusting the saturation correction learning rate. That is, the stored saturation correction learning rate 298 may provide a starting point for the saturation correction learning rate during the next iteration of the method 300 and may be further adjusted at 312 during the next iteration of the method 300.

In at least some embodiments, at 316, the electronic device 201 determines an orientation error. The orientation error may be determined as the difference between the first orientation estimate and the second orientation estimate. That is, the orientation error may indicate the amount by which the first orientation estimate and the second orientation estimate differ.

In at least some embodiments, at 318, a saturation correction adjustment amount may be determined based on the orientation error and the saturation correction learning rate. In at least some embodiments, the saturation correction adjustment amount may be determined as the product of the orientation error and the saturation correction learning rate.

At 320, a corrected orientation is determined. The corrected orientation is determined based on the first orientation estimate (from 308) and also based on the saturation correction learning rate (which was obtained from the adjustment of 314). In at least some embodiments, the corrected orientation is determined by using the saturation correction learning rate to balance a relative importance of the second orientation estimate and the first orientation estimate. That is, the saturation correction learning rate is used to control the relative effect of the first orientation estimate with the second orientation estimate when determining the corrected orientation.

In at least some embodiments, the relative importance of the second orientation estimate and the first orientation estimate may be balanced by determining the corrected orientation based on the saturation correction adjustment amount which was determined at 318. That is, since the saturation correction adjustment amount is determined based on the first orientation estimate, the second orientation estimate and also the saturation correction learning rate, the saturation correction adjustment amount strikes a balance between the first orientation estimate and the second orientation estimate using the saturation correction learning rate. That is, a higher saturation correction learning rate will result in a higher saturation correction adjustment amount. Similarly, a lower saturation correction learning rate will result in a relatively lower saturation correction adjustment amount. In some embodiments, the corrected orientation may be determined by adding the saturation correction adjustment amount to the first orientation estimate. Thus, by using the saturation correction adjustment amount to determine the corrected orientation, the corrected orientation strikes a suitable balance between the first orientation estimate and the second orientation estimate.

It will be appreciated that, in at least some embodiments, some of the intermediate steps of the method 300 may be omitted. For example, rather than determining the orientation error at 316 and the saturation correction adjustment amount at 318, the electronic device could instead perform analogous operations at 320 when determining the corrected orientation. For example, at 320, rather than calculating the corrected orientation based on the saturation correction adjustment amount and the first orientation estimate, the electronic device could determine the corrected orientation based on the first orientation estimate, the second orientation estimate and the saturation correction learning rate. Accordingly, one or more of the intermediate determination steps of the method 300 could effectively be performed at 320.

In at least some embodiments, at 322, the corrected orientation may be stored in memory and may be designated as a past corrected orientation 299 for a future iteration of the method 300. That is, the corrected orientation may be used in a subsequent iteration of the method 300 to determine a future first orientation estimate (at 308 of a future iteration of the method 300).

The method 300 may be repeated. That is, further iterations of the method 300 may be performed. In a subsequent iteration of the method, the electronic device 201 may rely on one or more values obtained during the iteration of the method 300 discussed above. For example, as noted above, the corrected orientation which was stored during this iteration of the method 300 may be subsequently used as a reference point when calculating the first orientation estimate in a future iteration of the method 300. Similarly, the saturation correction learning rate which was stored during this iteration of the method 300 may be subsequently used as a starting point when determining a saturation correction learning rate during the future iteration of the method 300.

Accordingly, a subsequent gyroscope reading (which may be referred to as a second gyroscope reading) may be obtained during the next iteration of the method 300. During this next iteration of the method 300, the saturation correction learning rate may be further adjusted based on a determination regarding whether the gyroscope 108 was saturated when the second gyroscope reading was obtained.

Since information, such as the saturation correction learning rate, is passed between iterations of the method 300, if the gyroscope 108 was saturated during two sequential iterations of the method 300, then the saturation correction learning rate may be increased during the first iteration of the method 300 and then further increased during the second iteration of the method 300. As a result, the saturation correction learning rate is related to the duration of a period of saturation. Thus, for the purposes of determining a corrected orientation, as the period of saturation grows, the relative importance of the second orientation estimate is increased and the relative importance of the first orientation estimate is decreased.

Figure 4:
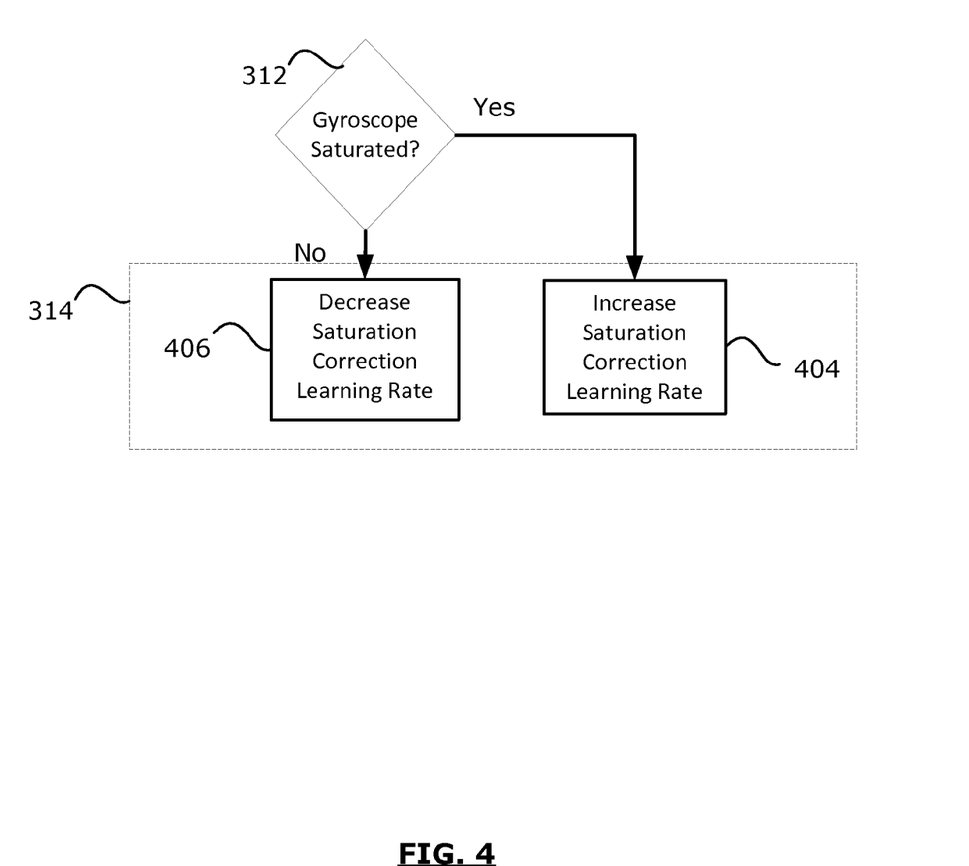
FIG. 4 is a flowchart of an example method of adjusting a saturation correction learning rate in accordance with example embodiments of the present disclosure.

Referring now to FIG. 4, operation 314 of FIG. 3 and its relation to the result from 312 of FIG. 3 will be discussed in greater detail. That is, FIG. 4 illustrates the adjustment of the saturation correction learning rate based on the determination (at 312) regarding whether the gyroscope 108 is saturated.

At 312, the electronic device determines whether the gyroscope was saturated in the manner described above with reference to FIG. 3.

At 314, the electronic device adjusts the saturation correction learning rate based on the determination regarding whether the gyroscope is saturated. At 314, the saturation correction learning rate may be increased (at 404) or decreased (at 406).

If, at 312, the electronic device determines that the gyroscope 108 is saturated, then at 404, the saturation correction learning rate may be increased. In at least some embodiments, the saturation correction learning rate may be increased by a fixed, predetermined amount.

In at least some embodiments, the saturation correction learning rate may be constrained by a predetermined upper threshold. That is, the saturation correction learning rate may only be increased so that the saturation correction learning rate is beneath a predetermined upper threshold. When the saturation correction learning rate reaches the upper threshold, no further upward adjustments are permitted. In some embodiments, the upper threshold is one.

If, at 312, the electronic device 201 determines that the gyroscope 108 is not saturated, then at 406, the saturation correction learning rate may be decreased. In at least some embodiments, the saturation correction learning rate may be decreased by a fixed, predetermined amount. The fixed, predetermined amount may, in some embodiments, be the same fixed, predetermined amount used in 404 when increasing the saturation correction learning rate. However, in other embodiments, the amount may be different than the amount used in 404.

In at least some embodiments, the saturation correction learning rate may be constrained by a predetermined lower threshold. That is, the saturation correction learning rate may only be decreased so that the saturation correction learning rate is above a predetermined lower threshold. When the saturation correction learning rate reaches the lower threshold, no further downward adjustments are permitted. In some embodiments, the lower threshold is zero.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or BLU-RAY™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method for providing a corrected orientation of a gyroscope on an electronic device, the method comprising:
    generating a gyroscope reading output using the gyroscope based on a first rotational movement of the electronic device;
    determining, by the processor, a first orientation estimate based on the gyroscope reading and a past corrected orientation and determining a second orientation estimate based on sensor readings generated using one or more sensors other than the gyroscope;
    determining, by the processor, whether the gyroscope was saturated when the gyroscope reading was generated;
    adjusting, by the processor, a saturation correction learning rate for the gyroscope based on the result of the determination of whether the gyroscope was saturated, the saturation correction learning rate controlling an amount of correction to apply to the first orientation estimate; and
    outputting the corrected orientation calculated based on the first orientation estimate, the second orientation estimate and the saturation correction learning rate,
    wherein adjusting the saturation correction learning rate for the gyroscope comprises increasing the saturation correction learning rate for the gyroscope if the gyroscope was saturated and
    wherein the saturation correction learning rate is iteratively increased over time if the gyroscope remains saturated for an extended period of time.

2. The method of claim 1, wherein adjusting the saturation correction learning rate for the gyroscope based on the result of the determination of whether the gyroscope was saturated comprises:

increasing the saturation correction learning rate for the gyroscope to a first level if the gyroscope was saturated.

3. The method of claim 2, further comprising:
generating a second gyroscope reading using the gyroscope based on a second rotational movement of the electronic device;
determining, by the processor, whether the gyroscope was saturated when the second gyroscope reading was generated; and
further adjusting, by the processor, the saturation correction learning rate for the gyroscope based on the result of the determination of whether the gyroscope was saturated when the second gyroscope reading was generated.

4. The method of claim 3, wherein further adjusting the saturation correction learning rate comprises:
further increasing the saturation correction learning rate for the gyroscope to a second level greater than the first level if the gyroscope was saturated during the second gyroscope reading.

5. The method of claim 1, further comprising:
determining the second orientation estimate based on an accelerometer reading and a magnetometer reading,
and wherein calculating the corrected orientation based on the first orientation estimate, the second orientation estimate and the saturation correction learning rate comprises determining the corrected orientation by determining a weight of the first orientation estimate and a weight of the second orientation estimate using the saturation correction learning rate.

6. The method of claim 5, further comprising:
determining an orientation error as the difference between the first orientation estimate and the second orientation estimate; and
determining a saturation correction adjustment amount based on the orientation error and the saturation correction learning rate,
wherein determining a weight of the first orientation estimate and a weight of the second orientation estimate using the saturation correction learning rate comprises determining the corrected orientation based on the saturation correction adjustment amount and the first orientation estimate.

7. The method of claim 1 wherein determining whether the gyroscope was saturated when the gyroscope reading was generated comprises:
retrieving, from memory, a gyroscope saturation value; and
comparing the gyroscope reading to the gyroscope saturation value.

8. The method of claim 7, further comprising:
determining if the gyroscope reading exceeds the gyroscope saturation value; and
when the gyroscope reading exceeds the gyroscope saturation value, replacing the gyroscope saturation value with the gyroscope reading.

9. The method of claim 1, wherein adjusting a saturation correction learning rate for the gyroscope based on the result of the determination of whether the gyroscope was saturated comprises:
decreasing the saturation correction learning rate for the gyroscope if the gyroscope was not saturated.

10. An electronic device comprising:
a memory;
a gyroscope;
a processor coupled to the memory and the gyroscope, the processor being configured to provide a corrected orientation of the gyroscope by:
generating a gyroscope reading output using the gyroscope based on a first rotational movement of the electronic device;
determining a first orientation estimate based on the gyroscope reading and a past corrected orientation and determining a second orientation estimate based on readings generated using one or more sensors other than the gyroscope;
determining whether the gyroscope was saturated when the gyroscope reading was generated;
adjusting a saturation correction learning rate for the gyroscope based on the result of the determination of whether the gyroscope was saturated, the saturation correction learning rate controlling an amount of correction to apply to the first orientation estimate; and
outputting the corrected orientation calculated based on the first orientation estimate, a second orientation estimate and the saturation correction learning rate,
wherein adjusting the saturation correction learning rate for the gyroscope comprises increasing the saturation correction learning rate for the gyroscope if the gyroscope was saturated and wherein the saturation correction learning rate is iteratively increased over time if the gyroscope remains saturated for an extended period of time.

11. The electronic device of claim 10, wherein adjusting the saturation correction learning rate for the gyroscope based on the result of the determination of whether the gyroscope was saturated comprises:
increasing the saturation correction learning rate for the gyroscope to a first level if the gyroscope was saturated.

12. The electronic device of claim 11, wherein the processor is further configured to:
generate a second gyroscope reading using the gyroscope based on a second rotational movement of the electronic device;
determine whether the gyroscope was saturated when the second gyroscope reading was generated; and
further adjust the saturation correction learning rate for the gyroscope based on the result of the determination of whether the gyroscope was saturated when the second gyroscope reading was generated.

13. The electronic device of claim 12, wherein further adjusting the saturation correction learning rate comprises:
further increasing the saturation correction learning rate for the gyroscope to a second level greater than the first level if the gyroscope was saturated during the second gyroscope reading.

14. The electronic device of claim 10, wherein the processor is further configured to:
determine the second orientation estimate based on an accelerometer reading and a magnetometer reading,
and wherein calculating the corrected orientation based on the first orientation estimate, the second orientation estimate and the saturation correction learning rate comprises determining the corrected orientation by determining a weight of the first orientation estimate and a weight of the second orientation estimate using the saturation correction learning rate.

15. The electronic device of claim 14, wherein the processor is further configured to:
determine an orientation error as the difference between the first orientation estimate and the second orientation estimate; and
determine a saturation correction adjustment amount based on the orientation error and the saturation correction learning rate, wherein determining a weight of the first orientation estimate and a weight of the second orientation estimate using the saturation correction learning rate comprises determining the corrected orientation based on the saturation correction adjustment amount and the first orientation estimate.

16. The electronic device of claim 10, wherein adjusting a saturation correction learning rate for the gyroscope based on the result of the determination of whether the gyroscope was saturated comprises:

decreasing the saturation correction learning rate for the gyroscope if the gyroscope was not saturated.

17. A non-transitory computer readable storage medium comprising computer-executable instructions for providing a corrected orientation for a gyroscope by:

generating a gyroscope reading using the gyroscope based on a first rotational movement of the electronic device;

determining, by a processor, a first orientation estimate based on the gyroscope reading and a past corrected orientation and determining a second orientation estimate based on readings generated using one or more sensors other than the gyroscope;

determining, by a processor, whether the gyroscope was saturated when the gyroscope reading was obtained;

adjusting, by a processor, a saturation correction learning rate for the gyroscope based on the result of the determination of whether the gyroscope was saturated, the saturation correction learning rate controlling an amount of correction to apply to the first orientation estimate; and outputting the corrected orientation calculated based on the first orientation estimate, a second orientation estimate and the saturation correction learning rate, wherein adjusting the saturation correction learning rate for the gyroscope comprises increasing the saturation correction learning rate for the gyroscope if the gyroscope was saturated and wherein the saturation correction learning rate is iteratively increased over time if the gyroscope remains saturated for an extended period of time.

* * * * *